United States Patent

Widdig et al.

[11] 3,720,682
[45] March 13, 1973

[54] SUBSTITUTED AMIDOPHENYLTHIOUREAS

[75] Inventors: Arno Widdig; Engelbert Kuhle; Klaus Sasse; Hans Scheinpflug; Ferdinand Grewe; Helmut Kaspers; Paul-Ernst Frohberger, all of Leverkusen, Germany

[73] Assignee: Bayer Aktiengesellschaft, Leverkusen, Germany

[22] Filed: Nov. 6, 1970

[21] Appl. No.: 87,590

[30] Foreign Application Priority Data

Nov. 29, 1969 Germany..................P 19 60 027.2

[52] U.S. Cl..................260/294.8 H, 260/306.8 R, 260/332.2 C, 260/347.2, 260/552 R, 424/266, 424/270, 424/275, 424/285
[51] Int. Cl...........................................C07d 31/50
[58] Field of Search.................260/294.8 H, 347.2

[56] References Cited

UNITED STATES PATENTS 3,642,891  2/1972  Teach..............................260/553 A Primary Examiner—Alan L. Rotman
Attorney—Burgess, Dinklage & Sprung

[57] ABSTRACT

Amidophenylthioureas of the formula:

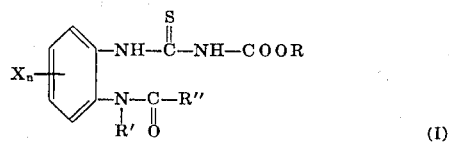

in which
each X independently stands for a halogen atom, alkyl with one to four carbon atoms or alkoxy with one to four carbon atoms,
n stands for 0, 1 or 2,
R stands for alkyl with one to 12 carbon atoms,
R' stands for a hydrogen atom or alkyl with one to four carbon atoms, and
R'' stands for a five- or six-membered heterocyclic radical which may contain one or more heteroatoms selected from oxygen, sulfur and nitrogen atoms, which possess fungicidal properties and which may be produced by conventional methods.

5 Claims, No Drawings

SUBSTITUTED AMIDOPHENYLTHIOUREAS

The present invention relates to and has for its objects the provision of particular new amidophenylthioureas which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that certain dithiocarbamates can be used as fungicides, for example zinc ethylene-1,2bis-dithiocarbamate (A) (see U.S. Pat. No. 2,457,674). However, at low application concentrations the effectiveness of this compound is not always satisfactory.

The present invention provides amidophenylthioureas of the general formula:

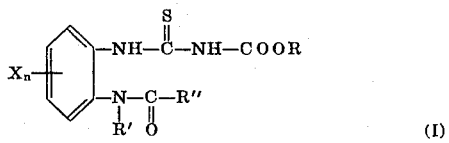

in which
each X independently stands for a halogen atom, alkyl with one to four carbon atoms or alkoxy with one to four carbon atoms,
n stands for 0, 1 or 2,
R stands for alkyl with one to 12 carbon atoms,
R' stands for a hydrogen atom or alkyl with one to four carbon atoms, and
R'' stands for a five- or six-membered heterocyclic radical which may contain one or more heteroatoms selected from oxygen, sulfur and nitrogen atoms.

The compounds of the formula (1) have been found to exhibit strong fungicidal properties.

The present invention also provides a process for the production of the amidophenylthioureas of the formula (I) in which a 2-aminoaniline derivative of the formula

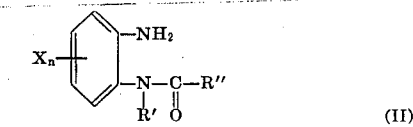

in which
X, n, R' and R'' are the same as defined above, is reacted with an isothiocyanate of the formula $$ROOC-N=C=S \quad (III)$$

in which
R is the same as defined above, in the presence of a diluent (which term includes a solvent).

It is decidedly surprising that the thioureas according to the invention exhibit a higher fungicidal activity than the above-mentioned zinc ethylene-1,2-bis-dithiocarbamate. The compounds according to the invention therefore represent a substantial enrichment of the art.

When 2-furoylaminoaniline and ethoxycarbonylisothiocyanate are used as starting materials, the reaction course can be represented by the following equation:

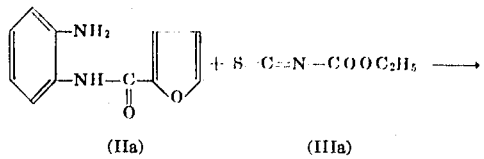

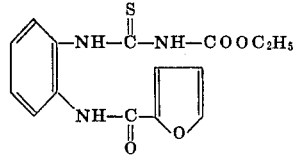

The 2-aminoaniline derivatives are defined by the formula (II). In this formula, as in formula (I), X stands preferably for chlorine, bromine, fluorine, methyl, ethyl, isopropyl, n-butyl, methoxy, ethoxy or isopropoxy; n stands preferably for 0 or 1; R' stands preferably for hydrogen, methyl or ethyl; and R'' stands preferably for 2-furyl, 2-thienyl, 2-pyridyl, 3-pyridyl, 4-pyridyl or 4-thiazolyl.

The 2-aminoaniline derivatives used as starting materials are partially known (see J. org. Chem. Vol 27 II, 2,163 (1962)). They can be obtained by reduction or catalytic hydrogenation of the appropriate 2-nitroanilides.

As examples of the 2-aminoaniline derivatives, there may be mentioned:
2-furancarboxylic acid (2'-amino)-anilide, 2-thiophenecarboxylic acid (2'-amino)-anilide, picolinecarboxylic acid (2'-amino)-anilide, nicotinecarboxylic acid (2'-amino)-anilide, isonicotinecarboxylic acid (2'-amino)-anilide and 4-thiazolecarboxylic acid (2'-amino)-anilide.

The isothiocyanates used as starting materials are defined by the formula (III). In this formula, as in formula (I), R stands preferably for methyl, ethyl or propyl. Some of the isothiocyanates are known [see J. Chem. Soc. 93, 696 (1908)]. They can also be obtained from the reaction between alkali methal isothiocyanates and haloformic acid esters.

As examples of the isothiocyanates which may be used in the process of the invention, there may be mentioned: methoxycarbonylisothiocyanate, ethoxycarbonylisothiocyanate, propoxycarbonylisothiocyanate and isopropoxycarbonylisothiocyanate.

When carrying out the process according to the invention, any inert organic solvent is suitable as the diluent. These include for example: hydrocarbons, such as benzine, ligroin, hexane, benzene and toluene; chlorinated hydrocarbons, such as methylene chloride, chloroform, carbon tetrachloride and chlorobenzene; ethers, such as diethyl ether, dibutyl ether, tetrahydrofuran and dioxane; ketones, such as acetone, methylisopropyl ketone and acetophenone, cyclohexanone; and any desired mixtures of the said solvents.

The reaction temperature can be varied within a fairly wide range. In general, this work is carried out between about −10° to + 60° C, preferably between about 0° to 40°C.

When carrying out the process according to the invention, 1 mole of isothiocyanate is preferably used per mole of 2-aminoaniline derivative. Amounts greater or lesser by up to 20 percent are possible without substantial diminution of the yield. When the reaction mixture is cooled, the end products are obtained in crystalline form and can be separated by suction filtration and, optionally, purified by redissolving or recrystallization.

A preferred embodiment of the process comprises preparing the required isothiocyanate from a haloformic acid ester and an alkali metal isothiocyanate in an inert solvent and, without isolating it, reacting it directly with the 2-aminoaniline derivative.

The active compounds according to the invention exhibit a strong fungitoxic activity. In the concentrations necessary for the control of fungi, they do not damage cultivated plants, and have a low toxicity to warm-blooded animals. For these reasons, they are suitable as crop protection agents for the control of fungi. Fungitoxic agents in crop protection are used for the control of Archimycetes, Phycomycetes, Ascomycetes, Basidiomycetes and *Fungi Imperfecti*.

The active compounds according to the invention have a very broad activity spectrum and can be applied against parasitic fungi which infect above-the-soil parts of plants or attack the plants from the soil, as well as against seed-borne pathogenic agents.

They are particularly effective against fungi which cause powdery mildew diseases. To this group of fungi there belong predominantly representatives from the Erysiphaceae family with the most important genera being Erysiphe, Uncinula (*Oidium*), Sphaerotheca and Podosphaera. Important fungi include *Erysiphe cichoracearum*, *Podosphaera leucotricha* and *Uncinula necator*.

The active compounds according to the invention also give good results in the control of rice diseases. Thus, they show an excellent activity against the fungi *Piricularia oryzae* and *Pellicularia sasakii*, by reason of which they can be used for the joint control of these two diseases. This means a substantial advance, since, up to now, agents of different chemical constitution were required against these two fungi. Surprisingly, the active compounds show not only a protective activity but also a curative and systemic effect.

The active compounds according to the invention, however, also act against other fungi which infect rice or other cultivated plants, such as, for example, *Cochliobolus myiabeanus*, *Mycosphaerella musicola*, *Cercospora personata*, *Botrytis cinerea*, *Alternaria* species, *Verticillium alboatrum*, *Phialophora cinerescens* and *Fusarium* species as well as against the bacterium *Xanthomonas oryzae*.

The active compounds according to the instant invention can be utilized, if desired, in the form of the usual formulations or compositions with conventional inert (i.e., plant compatible or herbicidally inert) pesticide diluents or extenders, i.e., diluents or extender of the type usable in conventional pesticide formulations or compositions, e.g., conventional pesticide dispersible carrier vehicles, such as solutions, emulsions, suspensions, emulsifiable concentrates, spray powders, oils, pastes, soluble powders, dusting agents, granules, tablets, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents and non-solvents such as aromatic hydrocarbons (e.g., benzene, toluene, xylene, dimethyl napththalene, aromatic naphthas, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, etheralcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, (i.e., calcium carbonate, talc, keselguhr, diatomaceous earth, clay, montmorilonite, etc.), and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying or wetting agents, such as non-ionic and/or anionic emulsifying or wetting agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, acaricides, nematocides, bactericides, etc., including, especially fungicidal, organophosphorus compounds, carbamate compounds, dithiocarbamate compounds, chlorine compounds, dinitro compounds, organic sulfur or copper compounds, substituted phenoxy compounds, chlorophenols, substituted diphenyl ethers, anilide compounds, ureas, triazines, antibiotics, and other known agricultural chemicals and/or fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 2.0–90 percent, by weight of the mixture, whereas carrier composition mixtures suitable for direct application or field application generally contemplate those in which the active compound is present in an amount substantially between about 0.001–10 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally about 0.0001–10 percent, and preferably 0.01–1.0 percent, by weight of the mixture.

In the case of use as seed dressings, applied amounts of 0.1 to 10 g, preferably 0.2 to 2 g, of active compound per kg of seed are usually suitable.

In the case of use as soil treatment agents, applied amounts of 1 to 500 g, preferably 10 to 200 g, per cubic meter of soil are necessary.

The active compounds according to the invention show also an insecticidal and acaricidal activity as well as activity against some mold fungi and yeasts. In concentrations higher than those necessary for fungicidal use, the substances inhibit plant growth.

The active compounds can also be used in accordance with the well-known ultra-low-volume process with good success, i.e., by applying such compound if normally a liquid, or by applying a liquid composition containing the same, via very effective atomizing equipment in finely divided form, e.g., average particle diameter of from 50–100 microns; or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound, or even the 100 percent active substance alone, e.g., about 20–100 percent by weight of the active compound.

In particular, the present invention contemplates methods of selectively killing, combating or controlling fungi, which comprise applying to at least one of (a) such fungi and (b) their habitat, i.e., the locus to be protected, a fungicidally effective or toxic amount of the particular active compound of the the invention alone or together with a carrier vehicle as noted above. The instant formulations or compositions are applied in the usual manner, for instance by squirting, spraying, atomizing, vaporizing, scattering, dusting, watering, sprinkling, pouring, dressing, via incrustation; and the like.

Significantly, the fungicidal compositions of the present invention can be applied for example by spraying a dust formulation directly onto stems and leaves of plants; or by using the formulation as a seed-dressing; by spraying an emulsifiable concentrate, diluted with water, etc. to a desirable concentration, onto stems and leaves of plants; by suspending a wettable powder in water at a desirable concentration and spraying the formulation onto stems and leaves of plants; by applying granule formulations to the soil; and the like.

It will be realized, of course, that the concentration of the particular active compound utilized in admixture with the carrier vehicle will depend upon the intended application, the purpose for which the active compound is used, and the like. Therefore, in special cases, it is possible to go above or below the aforementioned concentration ranges and dosage amounts per unit area.

The fungicidal effectiveness of the particular new compounds of the present invention is illustrated, without limitation, by the following Examples:

EXAMPLE 1

Fusicladium test (systemic)
Solvent: 4.7 parts by weight acetone
Emulsifier: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3 – 4 leaf stage, watered once in one week with 20 cc of the liquid to be used for watering, in the stated concentration of active compound, with reference to 100 cc of soil. The plants so treated are, after the treatment, inoculated with an aqueous conidium suspension of *Fusicladium dendriticum* Fuckel and incubated for 18 hours in a humidity chamber at 18° – 20° C and at a relative atmospheric humidity of 100 percent. The plants are subsequently placed in a greenhouse for 14 days.

15 days after inoculation, the infection of the seedlings is determined as a percentage of the untreated but also inoculated control plants. 0 percent means no infection; 100 percent means that the infection is exactly as great as in the case of the control plants.

The active compounds, the concentrations of the active compounds and the results obtained can be seen from the following Table 1:

TABLE 1

FUSICLADIUM TEST (SYSTEMIC)

| Active compound | Infection as a percentage of the infection of the untreated control with a concentration of active compound of |  |
|---|---|---|
| | 120 p.p.m. | 30 p.p.m. |
| (A) $CH_2-NH-\overset{S}{\underset{\|}{C}}-S\diagdown_{Zn}$ $CH_2-NH-\underset{\|}{C}-S\diagup$ $\phantom{CH_2-NH-}S$ (known) | 100 | — |
| (1) [structure with NH–C(S)–NH–C(O)–OC₂H₅ and NH–C(O)–O ring] | 35 | 43 |

EXAMPLE 2

Erysiphe test
Solvent: 4.7 parts by weight acetone

Emulsifier: 0.3 parts by weight alkylaryl polyglycol ether

Water: 95.0 parts by weight

The amount of the active compound required for the desired concentration of active compound in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23°-24° C and at a relative atmospheric humidity of about 75 percent.

After 12 days, the infection of the cucumber plants is determined as a percentage of the untreated but also inoculated control plants. 0 percent means no infection; 100 percent that the infection is exactly as great as in the case of the control plants.

The active compounds, the concentrations of the active compounds and the results obtained can be seen from the following Table 2:

TABLE 2

Erysiphe Test

| Active compound | Infection as a percentage of the infection of the untreated control with a concentration of active compound of— | |
|---|---|---|
| | 0.025 percent | 0.0062 percent |
| (A) $CH_2-NH-\overset{S}{\underset{\parallel}{C}}-S$<br>     $\phantom{CH_2-NH-}\diagdown Zn$<br>$CH_2-NH-\underset{\parallel}{C}-S\diagup$<br>$\phantom{CH_2-NH-}S$<br>(known) | 100 | 100 |
| (1) phenyl-NH-C(=S)-NH-C(=O)-OC$_2$H$_5$, with NH-C(=O)-furyl (see structure) | 27 | 43 |

EXAMPLE 3

Erysiphe test/systemic

Solvent: 4.7 parts by weight acetone

Emulsifier: 0.3 parts by weight alkylaryl polyglycol ether

Water: 95 parts by weight

The amount of the active compound required for the desired concentration in the liquid to be used for watering is mixed with the stated amount of the solvent, and the concentrate is diluted with the stated amount of water containing the stated additions.

Cucumber plants grown in standard soil are, in the one- to two-leaf stage, watered three times in one week with 20 cc of the liquid to be used for watering, in the stated concentration of active compound with reference to 100 cc of soil.

The plants so treated are, after the treatment, inoculated with conidia of the fungus *Erysiphe cichoracearum*. The plants are subsequently placed in a greenhouse at 23°-24° C and at a relative atmospheric humidity of 70 percent.

After 12 days, the infection of the cucumber plants is determined as a percentage of the untreated but also inoculated control plants. 0 percent means no infection; 100 percent means that the infection is exactly as great as in the case of the control plants.

The active compounds, the concentrations of the active compounds and the results obtained can be seen from the following Table 3:

TABLE 3

Erysiphe Test (systemic)

| Active compound | Infection as a percentage of the infection of the untreated control with a concentration of active compound of— | |
|---|---|---|
| | 120 p.p.m. | 30 p.p.m. |
| (A) $CH_2-NH-\overset{S}{\underset{\parallel}{C}}-S$<br>     $\phantom{CH_2-NH-}\diagdown Zn$<br>$CH_2-NH-\underset{\parallel}{C}-S\diagup$<br>$\phantom{CH_2-NH-}S$<br>(known) | 100 | — |
| (1) phenyl-NH-C(=S)-NH-C(=O)-OC$_2$H$_5$, with NH-C(=O)-furyl | 30 | 23 |

EXAMPLE 4

Agar plate test

Test for fungitoxic effectiveness and breadth of the activity spectrum.

Solvent: acetone
Parts by weight: a. 1000
b. 100

To produce a suitable preparation of the active compound 1 part by weight of the active compound is taken up in the stated amount of solvent.

The preparation of the active compound is added to potato dextrose agar (which has been liquefied by heating) in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20° C for 3 days for incubation.

After this time, the inhibiting action of the active compound on the mycelium growth is determined in categories, taking into account the untreated control. Zero means no mycelium growth, either on the treated substrate or on the inoculum, the symbol − means mycelium growth on the inoculum only no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table 4:

EXAMPLE 6

Piricularia and Pellicularia Test

TABLE 4
Agar Plate Test

| Active compound | Concentration of active compound in the substrate in mg./liter | Sclerotinia sclerotiorum | Thielaviopsis basicola | Fusarium culmorum | Fusarium oxysporum |
|---|---|---|---|---|---|
| Untreated | | + | + | + | + |
| (A) CH₂—NH—CS—S\\Zn/CH₂—NH—CS—S (known) | 10<br>100 | +<br>+ | +<br>0 | +<br>+ | +<br>+ |
| (1) NH—C(S)—NH—C(O)—OC₂H₅ / NH—C(O)—furan | 10<br>100 | +<br>0 | −<br>0 | +<br>− | +<br>0 |

EXAMPLE 5

Seed dressing test/bunt of wheat (seed-born mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia caries* pe kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10° C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 5:

Solvent: 4 parts by weight acetone
Dispersing agent: 0.05 parts by weight sodium oleate
Water: 95.75 parts by weight
Other additives: 0.2 parts by weight gelatin The amount of active compound required for the desired concentration of active compound in the spray liquor is mixed with the stated amount of solvent, and the concentrate is diluted with the stated amount of water containing the stated additives.

Two batches each consisting of 30 rice plants about 2 – 4 weeks old are sprayed with the spray liquor until dripping wet. The plants remain in a greenhouse at temperatures of 22° to 24° C and a relative atmospheric humidity of about 70 percent until they are dry. One batch of the plants is then inoculated with an aqueous suspension of 100,000 to 200,000 spores/ml of *Piricularia oryzae* and placed in a chamber at 24° – 26° C and 100 percent relative atmospheric humidity. The other batch of the plants is infected with a culture of *Pellicularia sasakii* grown on malt agar and placed at 28° – 30° C and 100 percent relative atmospheric humidity.

5 to 8 days after inoculation, the infection of all the leaves present at the time of inoculation with *Piricularia oryzae* is determined as a percentage of the untreated but also inoculated control plants. In the case of

TABLE 5
Seed dressing test/bunt of wheat

| Active compound | Concentration of active compound in the dressing, in percent by weight | Amount of dressing used, in g./kg. of seed | Germination of spores in percent |
|---|---|---|---|
| Non-dressed | | | >10 |
| (A) CH₂—NH—CS—S\\Zn/CH₂—NH—CS—S (known) | 10 | 1 | 5 |
| (1) NH—C(S)—NH—C(O)—OC₂H₅ / NH—C(O)—furan | 1<br>3<br>10<br>30 | 1<br>1<br>1<br>1 | 0.005<br>0.005<br>0.005<br>0.005 | the plants infected with *Pellicularia sasakii*, the infection on the leaf sheaths after the same time is also determined in proportion to the untreated but infected control. 0 percent means no infection; 100 percent means that the infection is exactly as great in the case of the control plants.

The active compounds, the concentrations of the active compounds and the results obtained can be seen from the following Table 6:

TABLE 6
Piricularia (a) and Pellicularia (b) Test

| Active compound | Infection as a percentage of the infection of the untreated control with a concentration of active compound (in percent) of— | | | |
|---|---|---|---|---|
| | a | | b | |
| | 0.05 | 0.025 | 0.05 | 0.025 |
| (A) (known) | ¹ 26 ² 100 | ¹ 75 | ¹ 25 | ¹ 100 |
| (I) | ¹ 0 ² 0 | ¹ 0 ² 75 | ¹ 0 | ¹ 0 |

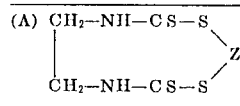

¹ Protective.
² Curative.

EXAMPLE 7

Podosphaera test (powdery mildew of apples) [Protective]

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are sprayed with the spray liquid until dripping wet. The plants remain in a greenhouse for 24 hours at 20° C and at a relative atmospheric humidity of 70 percent. They are then inoculated by dusting with conidia of the apple powdery mildew causative organism (*Podosphaera leucotricha* Salm.) and placed in a greenhouse at a temperature of 21° – 23° C and at a relative atmospheric humidity of about 70 percent.

10 days after the inoculation, the infestation of the seedlings is determined as a percentage of the untreated but also inoculated control plants.

0 percent means no infestation; 100 percent means that the infestation is exactly as great as in the case of the control plants.

The active compounds, the concentrations of the active compounds and the results obtained can be seen from the following Table 7:

TABLE 7
Podosphaera Test (Protective)

| Active compound | Infection as a percentage of the infection of the untreated control with a concentration of active compound of— | | |
|---|---|---|---|
| | 0.0062 | 0.0031 | 0.00156 |
| (A) (known) | 44 | 69 | ......... |
| (I) | 14 | ......... | 43 |

EXAMPLE 8

Podosphaera test (systemic)

Solvent: 4.7 parts by weight acetone
Dispersing agent: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3 – 4 leaf stage, watered in one week with 20cc of the liquid to be used for watering, in the stated concentration of active compound, with reference to 100cc of soil. The plants so treated are, after the treatment, inoculated with conidia of *Podosphaera leucotricha* Salm and placed in a greenhouse at a temperature of 21° – 23° C and at a relative atmospheric humidity of about 70 percent. 10 days after the inoculation, the infection of the seedlings is determined as a percentage of the untreated but also inoculated control plants.

0 percent means no infection; 100 percent means that the infection is exactly as great as in the case of the control plants.

The active compounds, the concentrations of the active compounds and the results obtained can be seen from the following Table 8:

TABLE 8
Podosphaera Test (systemic)

| Active compound | Infection as a percentage of the infection of the untreated control with a concentration of active compound of 120 p.p.m. |
|---|---|
| (A) (known) | 100 |

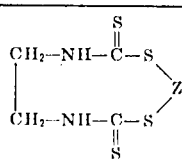

TABLE 8 – Continued
Podosphaera Test (systemic)

| Active compound | Infection as a percentage of the infection of the untreated control with a concentration of active compound of 120 p.p.m. |
|---|---|
| (1) NH—C(=S)—NH—C(=O)—OC₂H₅ with phenyl-NH—C(=O)-furan | 19 |

EXAMPLE 9

Fusicladium test (apple scab) [Curative]
Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are inoculated with an aqueous conidium suspension of the apple scab causative organism *Fusicladium dendriticum* Fuckel and incubated for 18 hours in a humidity chamber at 18° – 20° C and at an atmospheric humidity of 100 percent. The plants are then placed in a greenhouse where they dry.

After standing for a suitable period of time, the plants are sprayed dripping wet with the spray liquid prepared in the manner described above. The plants are subsequently placed in a greenhouse.

15 days after inoculation, the infestation of the apple seedlings is determined as a percentage of the untreated but also inoculated control plants.

0 percent means no infestation; 100 percent means that the infestation is exactly as great as in the case of the control plants.

The active compounds, the concentrations of the active compounds, the period of time between inoculation and spraying and the results obtained can be seen from the following Table 9:

TABLE 9
Fusicladium Test (Curative)

| Active compound | Residence period in hours | Infection as a percentage of the infection of the untreated control with a concentration of active compound of— | |
|---|---|---|---|
| | | 0.1 percent | 0.025 percent |
| (A) CH₂—NH—C(=S)—S\\Zn / CH₂—NH—C(=S)—S (known) | 42 | 75 | 91 |
| (1) phenyl-NH—C(=S)—NH—C(=O)—OC₂H₅ with —NH—C(=O)-furan | | ---------- | 16 |

The following Example illustrates, without limitation, the process for producing the particular new compounds of the present invention.

EXAMPLE 10

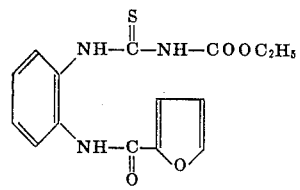

(1)

To 20.2 g (0.1 mole) of 2-furoylaminoaniline in 100 cc of dry chloroform are added dropwise, with stirring, 13.1 g (0.1 mole) ethoxycarbonylisothiocyanate, the temperature being kept to 30° C by cooling with ice. After further stirring for one hour, suction filtration is effected. Yield: 20 g (60 percent of the theory) N-(2-furoylaminophenyl)-N'-ethoxycarbonylthiourea which can be purified by recrystallization from acetonitrile. The compound has a melting point of 155°–156°C.

In analogous manner, the following compounds may be prepared:

N-[2-(thiophen(2)-carbonamido)-phenyl]-N'-methoxycarbonylthiourea,

N-[2-(pyridine(3)-carbonamido)-phenyl]-N'-ethoxycarbonylthiourea,

N-[2-(pyridine(4)-carbonamido)-phenyl]-N'-ethoxycarbonylthiourea and

N-[2-(thiazol(4)-carbonamido)-phenyl]-N'-methoxycarbonyl-thiourea.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Amidophenylthioureas of the formula:

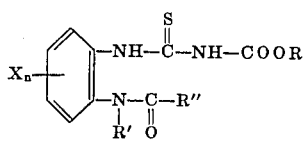

in which
each X independently stands for a halogen atom, alkyl with one to four carbon atoms or alkoxy with one to four carbon atoms,
n stands for 0, 1 or 2,
R stands for alkyl with one to 12 carbon atoms,
R' stands for a hydrogen atom or alkyl with one to four carbon atoms, and
R'' stands for furyl or pyridyl.

2. Thioureas according to claim 1 in which X stands for chlorine, bromine, fluorine, methyl, ethyl, isopropyl, n-butyl, methoxy, ethoxy or isopropoxy; n stands for 0 or 1; R stands for methyl, ethyl or isopropyl; R' stands for hydrogen, methyl or ethyl; and R'' stands for 2-furyl, 2-pyridyl, 3-pyridyl, or 4-pyridyl.

3. Compound according to claim 1 wherein such compound is N-(2-furoylaminophenyl)-N'-ethoxycarbonylthiourea of the formula

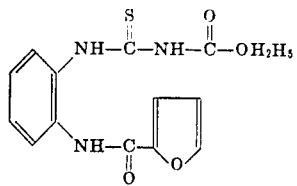

4. Compound according to claim 1 wherein such compound is N-[2-(pyridine(3)-carbonamido)-phenyl]-N'-ethoxycarbonyl-thiourea of the formula

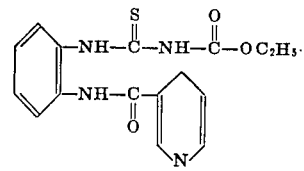

5. Compound according to claim 1 wherein such compound is N-[2-(pyridine(4)-carbonamido)-phenyl]-N'-ethoxycarbonyl-thiourea of the formula

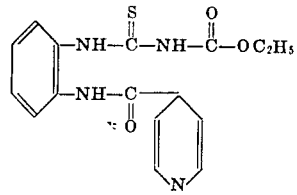

* * * * *